United States Patent
Elio et al.

(10) Patent No.: US 6,736,457 B2
(45) Date of Patent: May 18, 2004

(54) CONTINUOUS SEAT ADJUSTMENT MECHANISM

(75) Inventors: Paul A. Elio, Phoenix, AZ (US); Hariharan K. Sankaranarayanan, Scottsdale, AZ (US); Robert E. Glaspie, Phoenix, AZ (US)

(73) Assignee: Elio Engineering Inc., Phoenix, AZ (US)

( * ) Notice: Subject to any disclaimer, the term of this patent is extended or adjusted under 35 U.S.C. 154(b) by 0 days.

(21) Appl. No.: 10/165,144

(22) Filed: Jun. 7, 2002

(65) Prior Publication Data

US 2003/0227207 A1 Dec. 11, 2003

(51) Int. Cl.[7] ............................................... A47C 1/023
(52) U.S. Cl. ........................ 297/344.1; 397/374; 248/42
(58) Field of Search ............................. 297/344.1, 374; 248/429, 430

(56) References Cited

U.S. PATENT DOCUMENTS

| | | | |
|---|---|---|---|
| 2,292,718 A | | 8/1942 | Ryerson |
| 3,507,472 A | * | 4/1970 | Agee et al. .................. 248/429 |
| 4,154,422 A | | 5/1979 | Muhr |
| 4,381,096 A | | 4/1983 | Roper |
| 4,565,344 A | | 1/1986 | Iwami |
| 5,481,941 A | | 1/1996 | Premji |
| 5,596,910 A | | 1/1997 | Bauer et al. |
| 6,070,938 A | * | 6/2000 | Elio ........................... 297/374 |
| 6,086,154 A | | 7/2000 | Mathey et al. |
| 6,312,052 B1 | | 11/2001 | Elio |
| 6,318,696 B1 | | 11/2001 | Downey et al. |
| 6,334,600 B1 | | 1/2002 | Sakamoto |
| 6,357,814 B1 | | 3/2002 | Boisset et al. |

\* cited by examiner

Primary Examiner—Anthony D. Barfield
(74) Attorney, Agent, or Firm—Parsons & Goltry; Robert A. Parsons; Michael W. Goltry

(57) ABSTRACT

Continuous seat adjustment apparatus is used in conjunction with a seating device including a track assembly having an inner track and an outer track longitudinally movable on the inner track. The apparatus includes a pair of opposed jaws mounted on the outer track for pivotal movement between first and second orientations. Each of the jaws defines an opening with the inner track longitudinally extending therethrough. The jaws frictionally engage the inner track in the first orientation to substantially prevent longitudinal movement along the inner track and the jaws release the inner track in the second orientation to allow continuous longitudinal movement along the inner track. A spring device is affixed to the pair of opposed jaws to provide a bias on the jaws tending to move the jaws into the first orientation and an adjustment member is provided for moving the jaws against the spring bias from the first orientation to the second orientation.

14 Claims, 12 Drawing Sheets

CONTINUOUS SEAT ADJUSTMENT MECHANISM

FIELD OF THE INVENTION

This invention relates to seating devices.

More particularly, the present invention relates to seating devices incorporating continuous adjustment or movement.

In a further and more specific aspect, the present invention concerns vehicular seating devices.

BACKGROUND OF THE INVENTION

Within the art of vehicular seating devices and specifically to automotive seating devices, many and diverse devices have been developed. Movable seats, particularly those provided in vehicles such as automobiles, have requirements for safety purposes, e.g., they must lock firmly in a selected position. Also, the mechanism must be sufficiently robust to withstand forces generated in an accident or at least meet the criteria imposed on manufacturers.

Generally, this requirement is achieved by making the seat movable between specific steps or positions. In current conventional movable seats this movement is provided by a movable rod interlocking in one of a series of linearly displaced holes, a detent type arrangement, etc.

While these prior art devices are generally sufficiently rugged to hold the seat and operator rigidly in place, they are difficult to adjust and, in many instances, the movement steps leave an operator in an uncomfortable or unsafe position. In conventional vehicles, belts restrain the operator and any passengers. These seat belts firmly hold the individuals to their respective seat, preventing the individuals from being thrown about and injured from contact with various parts of the vehicle. If the seat can only be moved in specific steps, a seat belt associated with the seat may be too tight for comfort in one step and too loose for safety in the next step. Also, the driver of a vehicle may be too far from the steering wheel and controls in one step and too close in the next step.

Additionally, current track mechanisms have an inboard and an outboard side, which provide for seat adjustment and have to be locked on both sides for structural integrity. Due to structural flexibility, the inboard and outboard sides do not move precisely in tandem. Because the adjustment increment is discrete, it is possible that when one side is in a locked position the other side may be in an unlocked position. While the seat, as such, may feel locked, structural integrity is compromised because only one side is locked.

It would be highly advantageous, therefore, to remedy the foregoing and other deficiencies inherent in the prior art.

Accordingly, it is an object of the present invention to provide new and improved continuous seat adjustment apparatus.

Another object of the present invention is to provide new and improved continuous seat adjustment apparatus that is rugged and can withstand vehicle impact shocks.

And another object of the present invention is to provide new and improved continuous seat adjustment apparatus that is used to mount a seat in a vehicle.

Still another object of the present invention is to provide new and improved continuous seat adjustment apparatus, capable of continuous adjustment or movement anywhere between a maximum and a minimum position.

Yet another object of the present invention is to provide new and improved continuous seat adjustment apparatus that is simple and inexpensive to manufacture and easy to assemble.

SUMMARY OF THE INVENTION

Briefly, to achieve the desired objects of the invention in accordance with a preferred embodiment thereof, provided is continuous seat adjustment apparatus for use in conjunction with a seating device including a track assembly having an inner track and an outer track longitudinally movable on the inner track. The apparatus includes a pair of opposed jaws constructed to be mounted on the outer track for pivotal movement between first and second orientations. Each of the jaws has an opening defined therethrough formed to receive the inner track therein. The jaws frictionally engage the inner track in the first orientation to substantially prevent longitudinal movement along the inner track and release the inner track in the second orientation to allow continuous longitudinal movement along the inner track. A spring device is affixed to the pair of opposed jaws to provide a bias on the jaws tending to move the jaws into the first orientation. An adjustment member is affixed to one of the jaws for moving the jaws against the spring bias from the first orientation to the second orientation to allow free continuous longitudinal adjustment of the seat.

To further achieve the desired objects of the invention in accordance with a specific embodiment thereof, provided is continuous seat adjustment apparatus used in conjunction with a seating device including a track assembly having first and second spaced apart inner tracks and first and second spaced apart outer tracks longitudinally movable on the first and second inner tracks, respectively. The apparatus includes first and second substantially similar adjustment devices. The first adjustment device is associated with the first inner track and the first outer track and the second adjustment device is associated with the second inner track and the second outer track.

Each of the adjustment devices includes a pair of opposed jaws mounted on the associated outer track for pivotal movement between first and second orientations. Each of the jaws of the pair has an opening defined therethrough with the associated inner track longitudinally extending therethrough. The jaws frictionally engage the associated inner track in the first orientation to substantially prevent longitudinal movement along the associated inner track and the jaws release the associated inner track in the second orientation to allow continuous longitudinal movement or adjustment along the associated inner track. A spring device is affixed to the pair of jaws to provide a bias on the pair of jaws tending to move the pair of jaws into the first orientation. An adjustment member is affixed to one of the jaws of each of the first and second pairs of jaws for moving the first and second pairs of jaws against the spring bias from the first orientation to the second orientation so that the seat is freely adjustable in a longitudinal direction along the inner tracks.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF THE PREFERRED EMBODIMENT

Figure 1:
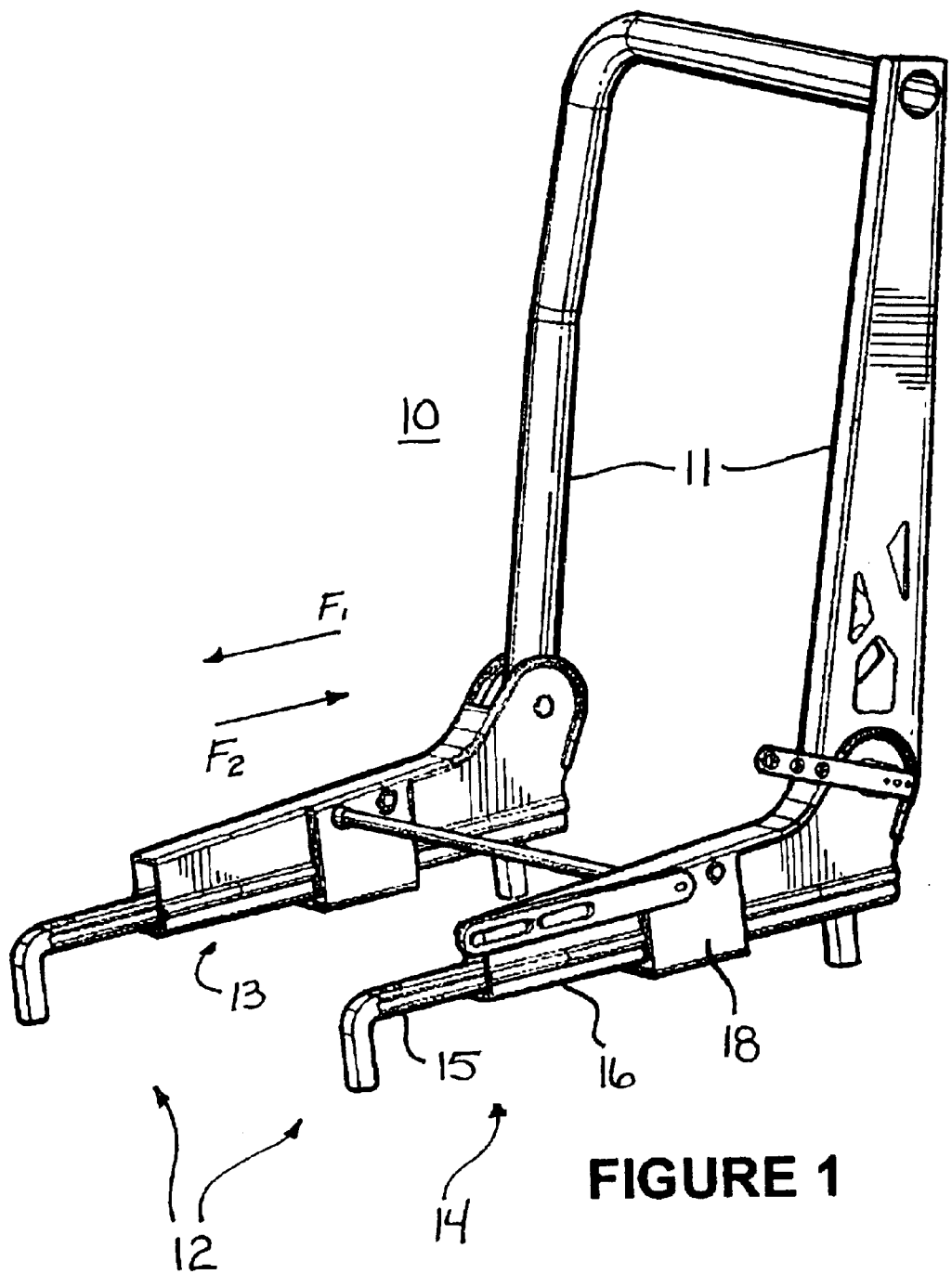
FIG. 1 is a perspective view of a seat frame including continuous seat adjustment apparatus according to the present invention.

Turning now to the drawings in which like reference characters indicate corresponding elements throughout the several views, attention is first directed to FIG. 1, which illustrates a seat frame 10 of a seat mechanism for use in vehicles or the like. Seat frame 10 includes a seat back 11 and a seat supporting track assembly 12. Track assembly 12 has an inboard portion 13 and an outboard portion 14. As each portion is substantially identical with regard to the construction and operation of the present invention, only one will be described in detail. Outboard portion 14 includes an inner track 15 and an outer track 16. Outer track 16 is constructed to be reciprocally movable along inner track 15 by employing continuous seat adjustment mechanism 18. Reciprocal movement of outer track 16 and the use of adjustment mechanism 18 in combination with track assembly 12 permits continuous adjustment of seat back 11 and outer track 16 along inner track 15, as will be explained in more detail presently.

Figure 2:
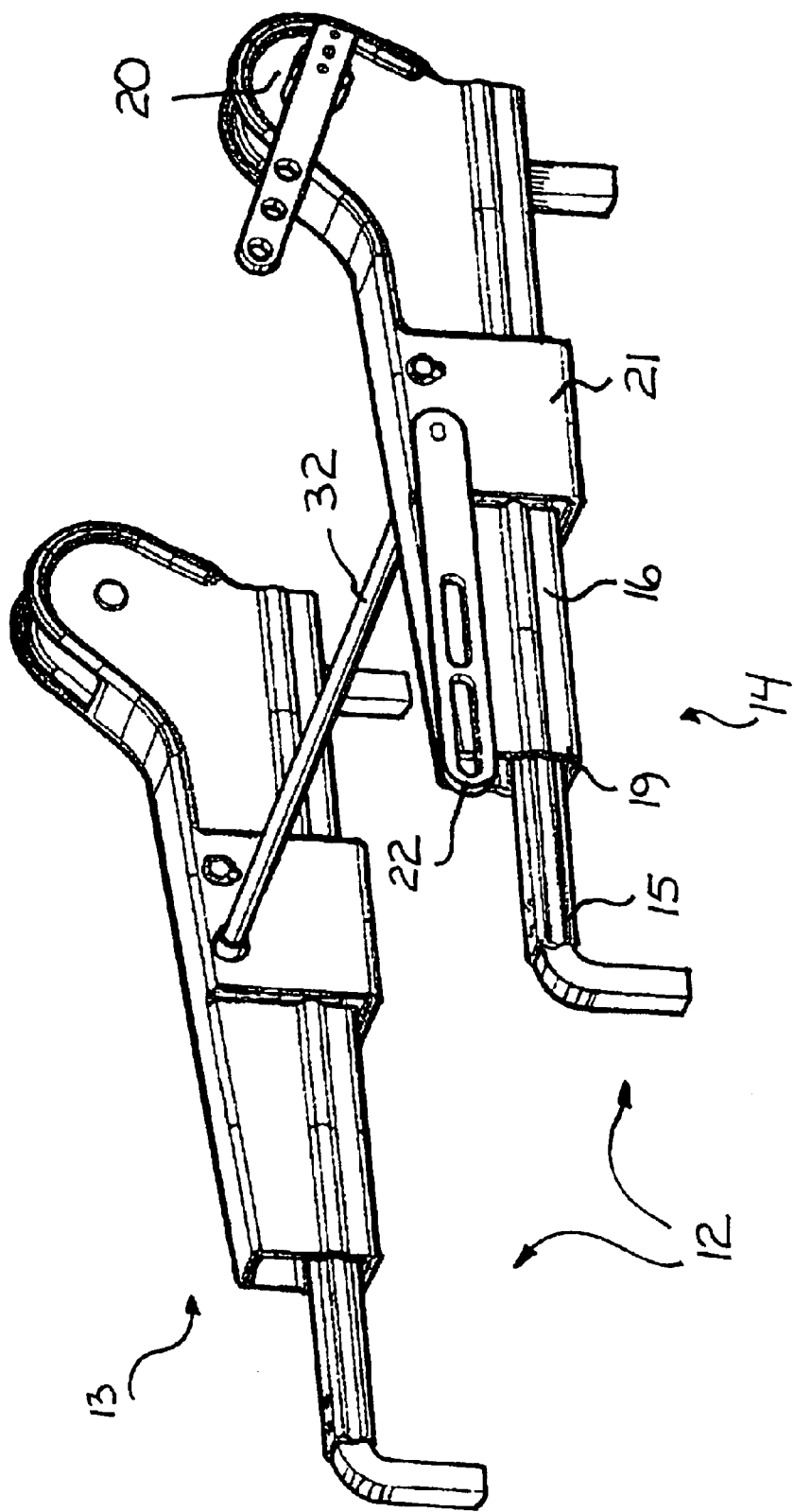
FIG. 2 is an enlarged side perspective view of the continuous seat adjustment apparatus of FIG. 1 with portions of the frame removed.

Referring additionally to FIG. 2, outer track 16 includes a housing 19 that ride on and encloses a substantial portion of inner track 15 for relative longitudinal movements therealong. A rear portion 20 of housing 19 is constructed to have seat back 11 pivotally mounted thereon. The mounting of seat back 11 will not be explained in detail herein since a variety of apparatus and methods can be used. However, in a preferred embodiment, a latch mechanism as disclosed in a co-pending patent application entitled ADJUSTABLE SUPPORT APPARATUS AND ARCHITECTURE FOR ADJUSTING SUPPORT APPARATUS, Ser. No. 09/092,675, herein incorporated by reference, is employed. Housing 19 also includes a transversely enlarged portion 21 enclosing adjustment mechanism 18, with an adjustment lever 22 positioned on the outside of portion 21 for easy access.

Figure 3:
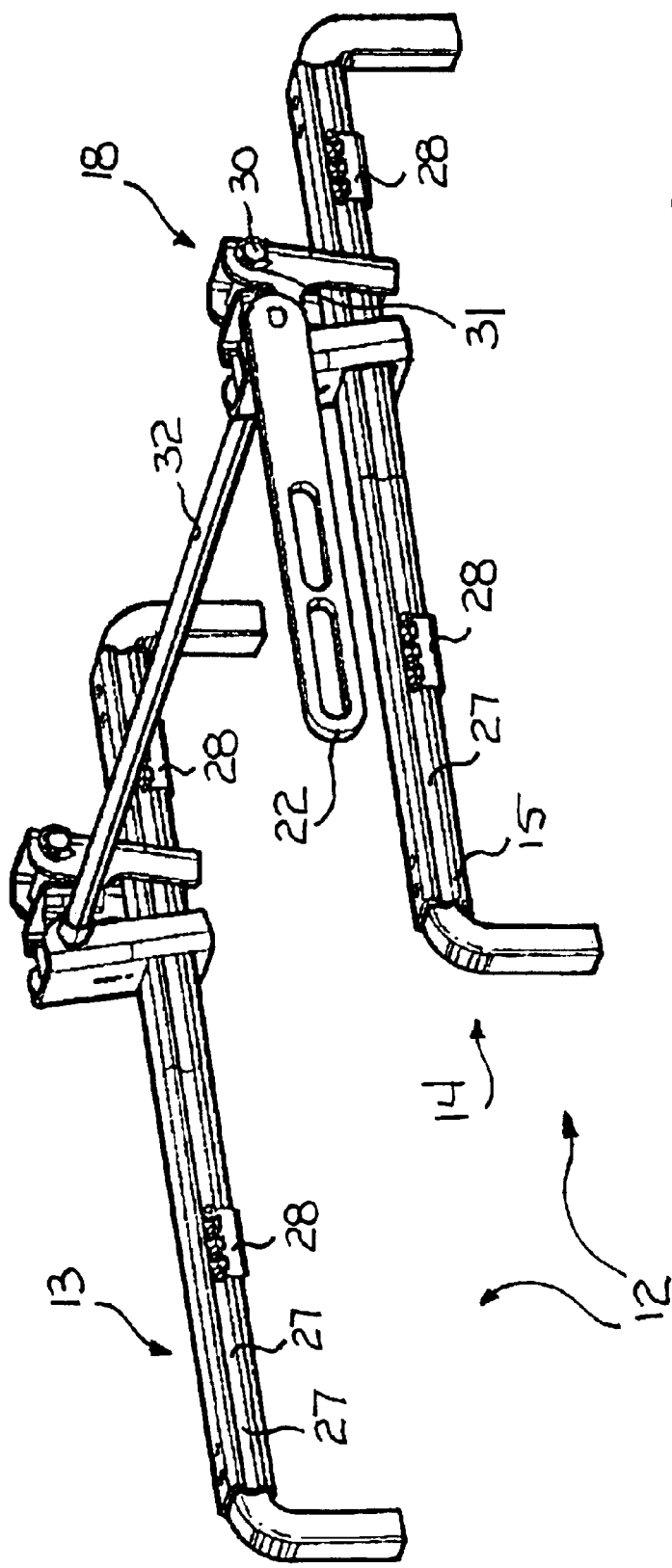
FIG. 3 is a side perspective view of the continuous seat adjustment apparatus of FIG. 2 with further portions of the frame removed to show internal construction.
Figure 4:
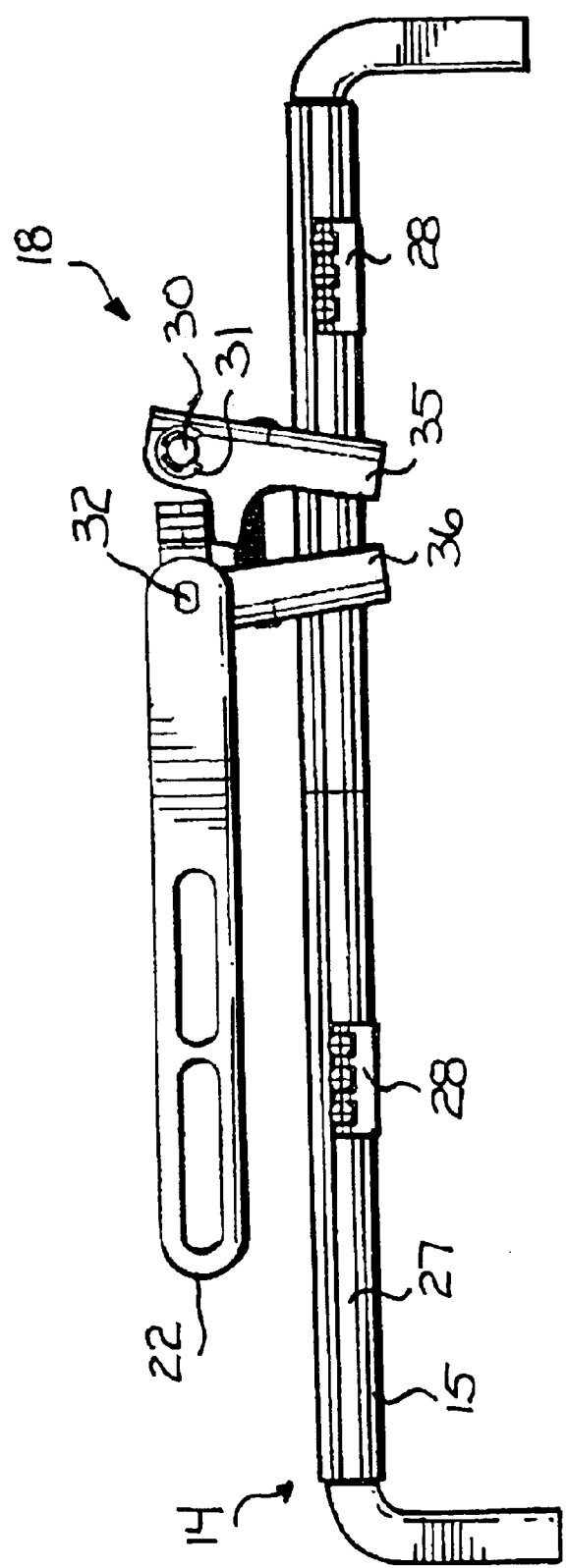
FIG. 4 is an enlarged side view of the continuous seat adjustment apparatus of FIG. 3.
Figure 5:
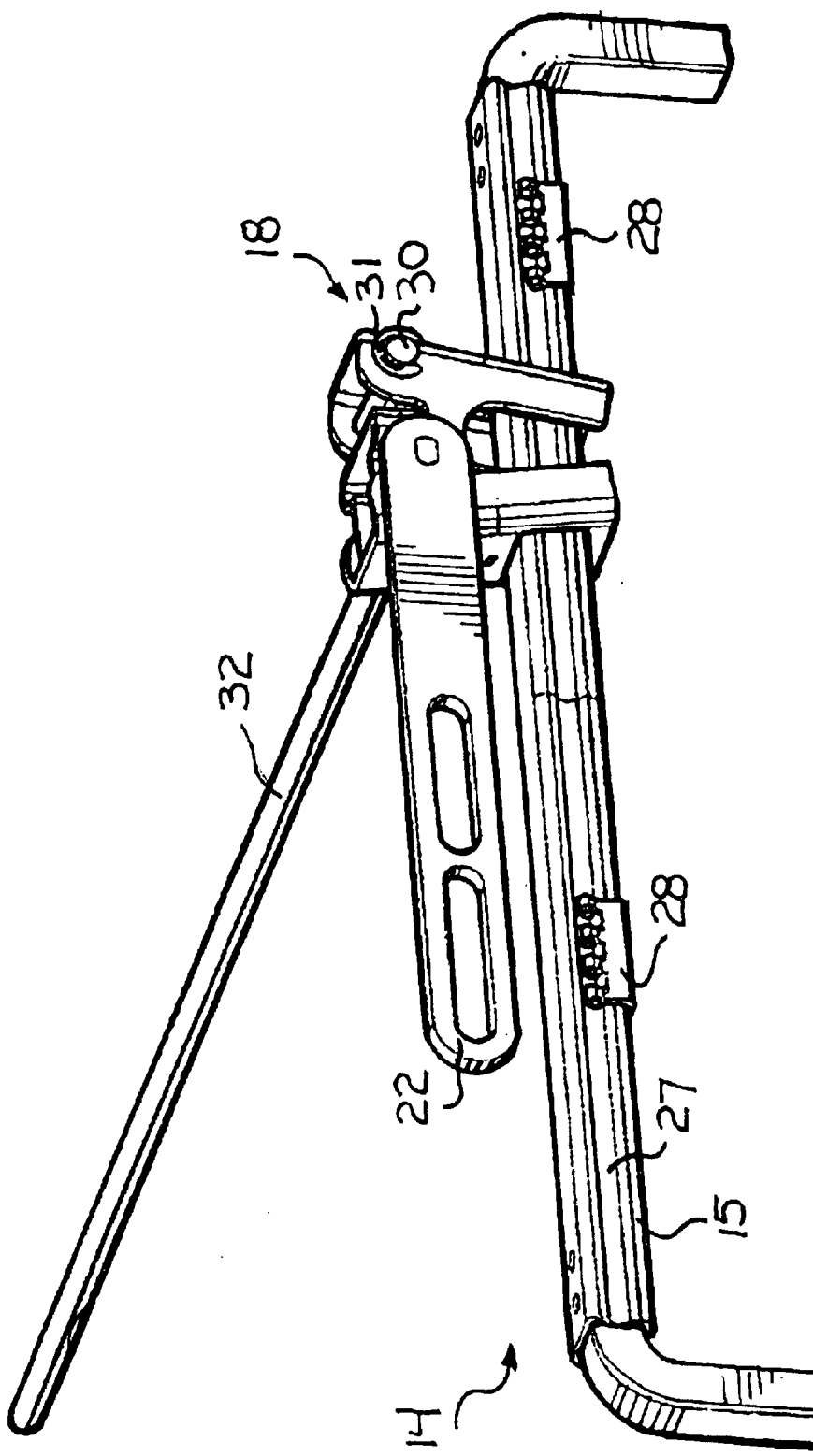
FIG. 5 is a perspective view of the continuous seat adjustment apparatus of FIG. 4, portions thereof removed.
Figure 6:
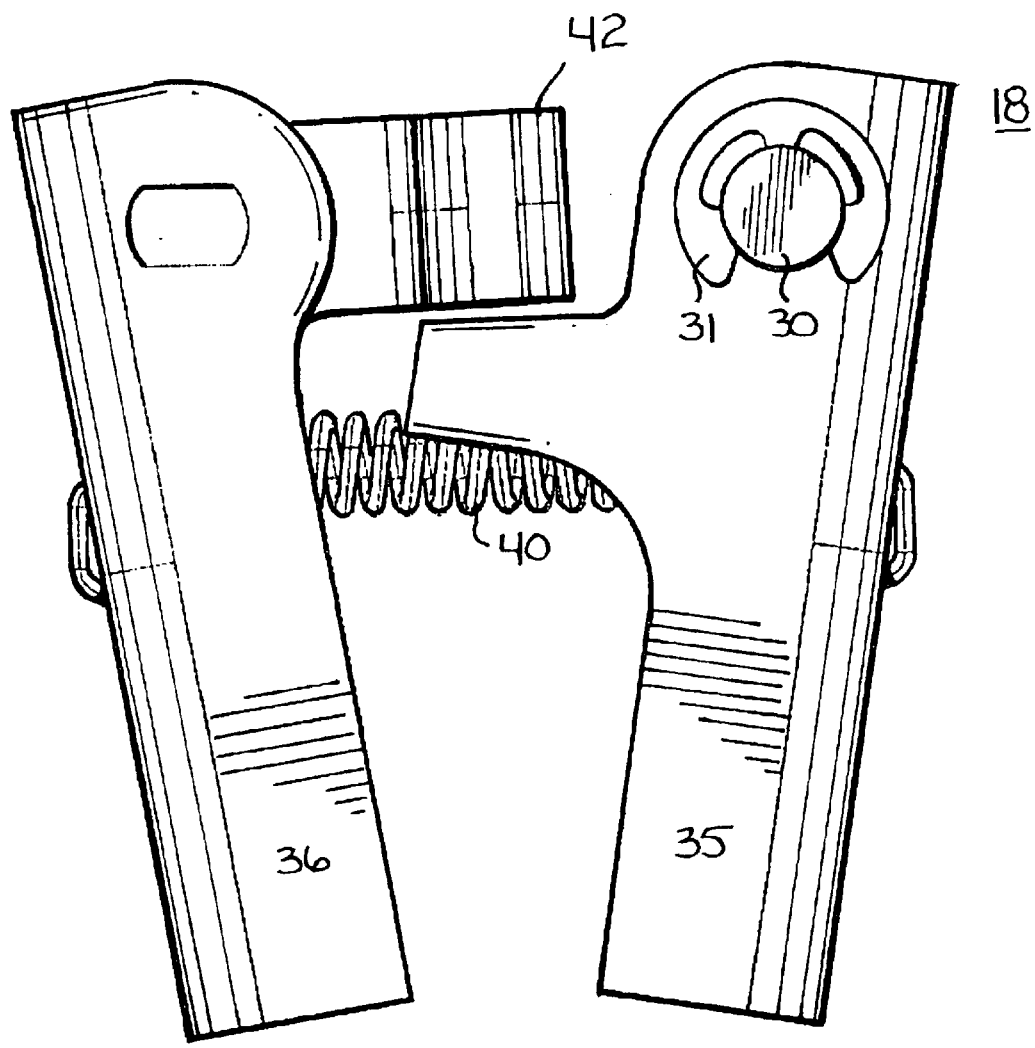
FIG. 6 is a greatly enlarged side view of a portion of the continuous seat adjustment apparatus of FIG. 4.

Referring additionally to FIGS. 3, 4 and 5, the apparatus of FIG. 2 is illustrated with housing 19 removed to better show the operating components. In this preferred embodiment, the horizontal portions of each of the inner tracks 15 and outer tracks 16 (for both inboard portion 13 and outboard portion 14) are formed with arcuate shaped longitudinally extending grooves 27 in both of the opposed vertical surfaces. Ball bearings are mounted on carriages 28, positioned so as to ride in grooves 27 for smooth longitudinal movement of outer tracks 16 along inner tracks 15. Adjustment mechanism 18 is affixed to housing 19 by means of a bolt 30, which in this embodiment is formed to receive a spring locking clip 31 on each end. Bolt 30 holds housing 19 fixedly engaged with adjustment mechanism 18 for longitudinal movement therewith. Also, a connecting rod 32 extends between adjustment mechanisms 18 on inboard portion 13 and outboard portion 14 and is engaged with adjustment lever 22. Connecting rod 32 is mounted to further aid in holding housing 19 fixedly engaged with adjustment mechanism 18.

Figure 7:
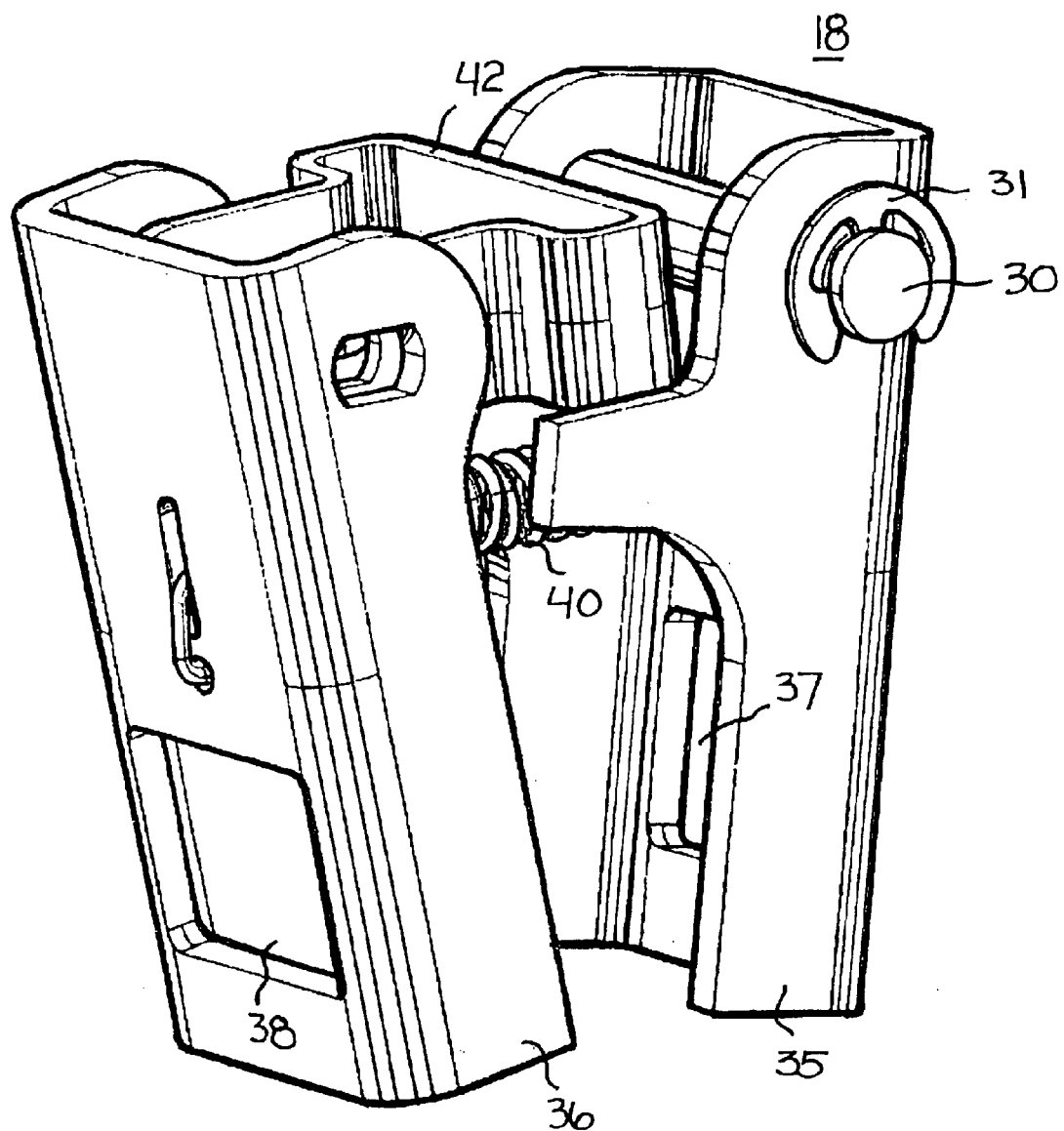
FIG. 7 is a perspective view of the portion of the continuous seat adjustment apparatus of FIG. 6.
Figure 8:
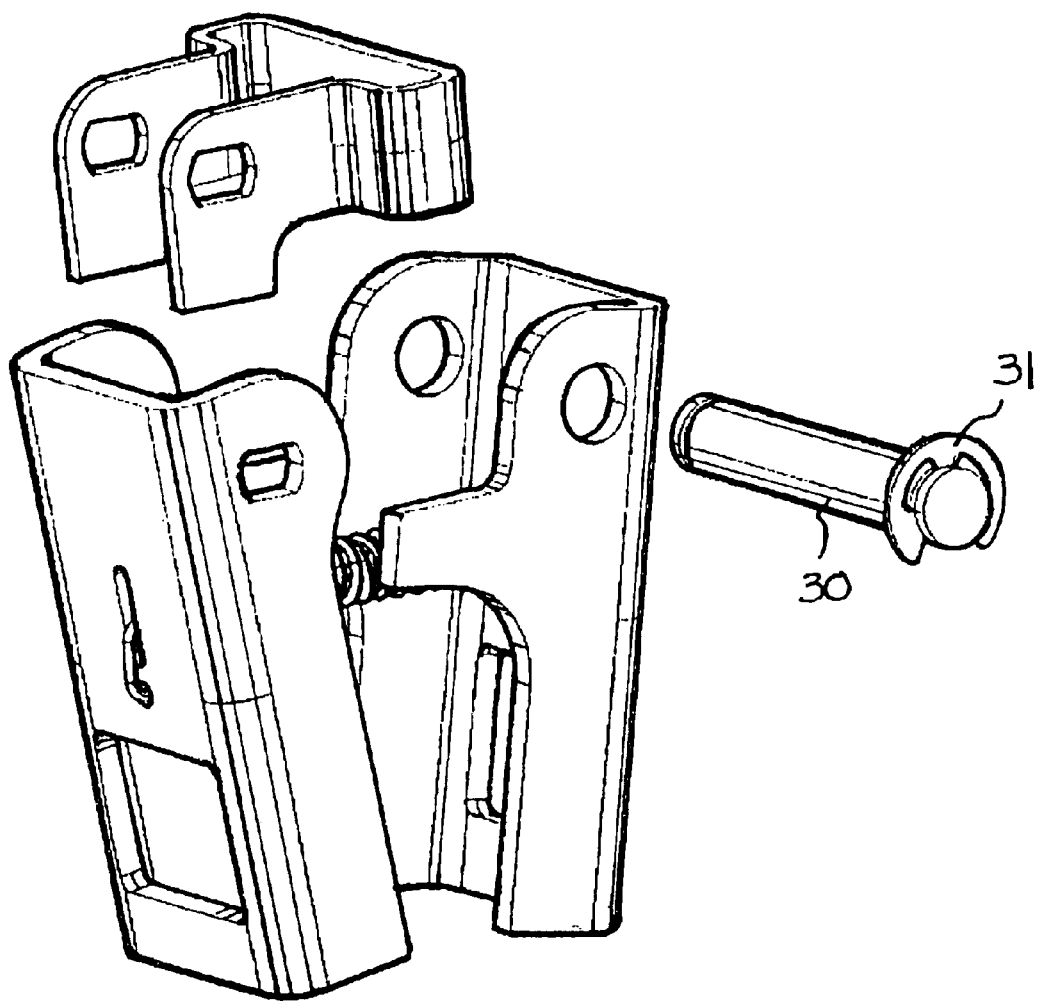
FIG. 8 is an exploded view in perspective of the portion of the continuous seat adjustment apparatus of FIG. 7.

Referring now to FIGS. 7 and 8, an enlarged view of adjustment mechanism 18 is illustrated for clarity. Mechanism 18 includes a pair of opposed jaws 35 and 36 having openings 37 and 38 therethrough, respectively, for receiving inner track 15. Jaw 35 is pivotally mounted in housing 19 by bolt 30 and jaw 36 is pivotally mounted in housing 19 by connecting rod 32. Here it should be noted that connecting rod 32 is constructed with a generally rectangular (or elliptical) shape. Further, an opening 39 through the upper end of jaw 36 is formed to mate with connecting rod 32 so as to rotate jaw 36 when connecting rod 32 is rotated by movement of adjustment lever 22. While a specific connecting rod and mating holes are illustrated and described in this embodiment, it will be understood that a variety of apparatus could be devised to move one or both of jaws 35 and 36 from a gripping orientation to a free sliding orientation (described in more detail below).

Jaws 35 and 36 are mounted in a spaced apart relationship and the lower ends are biased toward each other by means of a tension spring 40. While a specific spring is illustrated in this embodiment for providing the desired bias, it will be understood by those skilled in the art that a variety of different spring devices could be used. Openings 37 and 38 through jaws 35 and 36 are shaped to allow easy sliding movement of adjustment mechanism 18 along inner track 15 when jaws 35 and 36 are rotated into a substantially parallel orientation by upward rotation of adjustment lever 22. To this end a mechanical stop 42 is affixed to an inner surface of jaw 36. As jaw 36 is rotated by upward movement of adjustment lever 22, stop 42 comes into contact with bolt 30 and limits the relative rotation to a parallel position.

Upon the release of adjustment lever 22, spring 40 biases the lower ends of jaws 35 and 36 together so that inner track 15 is pinched tightly or frictionally engaged in openings 37 and 38 to prevent relative movement between inner track 15 and adjustment mechanism 18. Further, the frictional engagement between either jaw 35 or jaw 36 and inner track 15 will increase as forces attempt to move adjustment mechanism 18 (seat frame 10) in either direction along inner track 15. For example, if a force $F_1$ is applied to seat frame 10 in a forward direction (see FIG. 1), jaw 36 will be forced into tighter frictional engagement with inner track 15 to prevent forward longitudinal movement of seat frame 10. Also, if a force $F_2$ is applied to seat frame 10 in a rearward direction (see FIG. 1), jaw 35 will be forced into tighter frictional engagement with inner track 15 to prevent rearward longitudinal movement of seat frame 10. In some instances, as for example in a vehicle crash, the forces $F_1$ or $F_2$ can be large enough to cause jaw 36 or jaw 35 to actually deform or dent inner track 15 (see FIGS. 11 through 14). In these instances the deformation of inner track 15 further aids in preventing longitudinal movement of seat frame 10.

Figure 9:
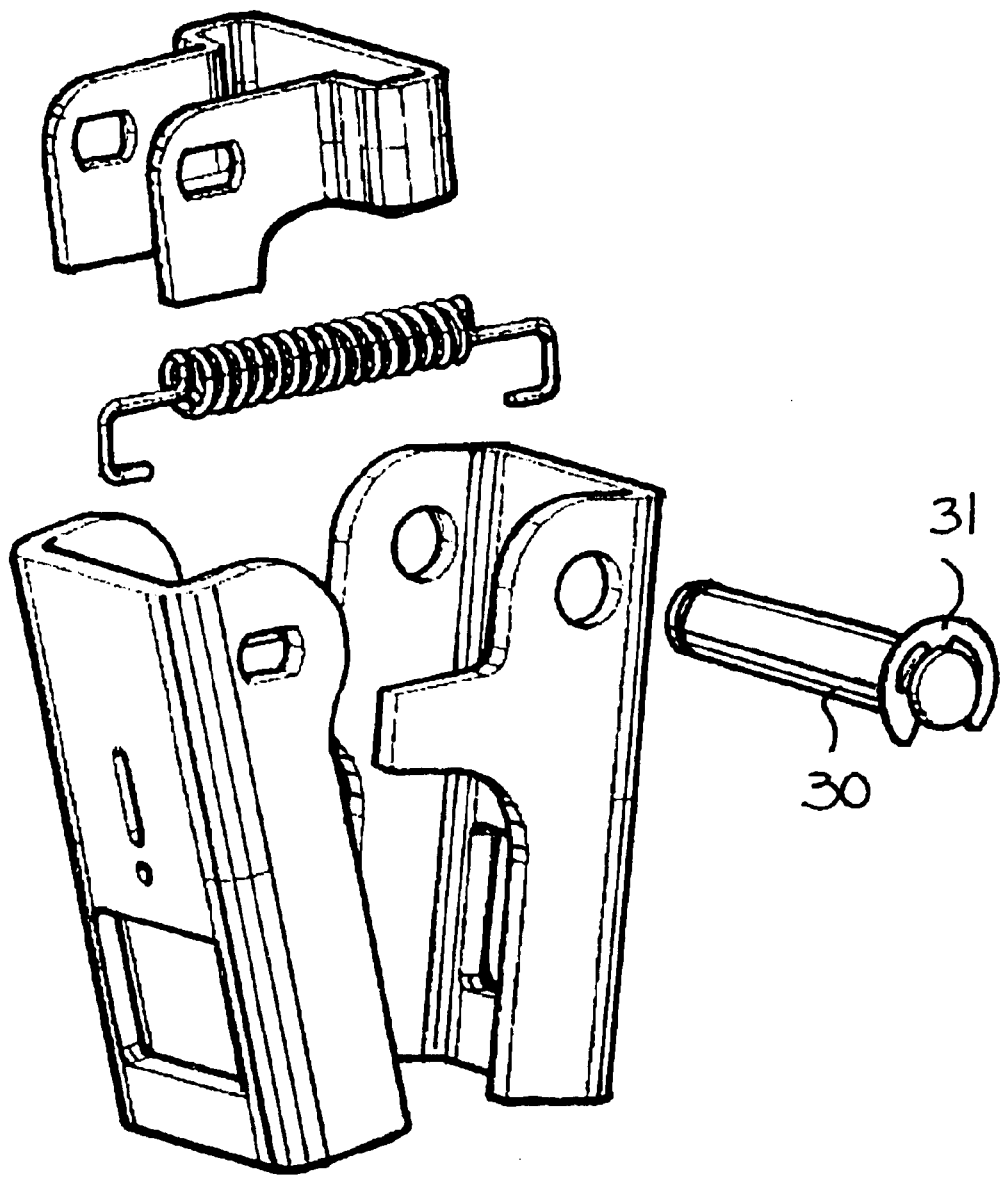
FIG. 9 is a further exploded view in perspective of the portion of the continuous seat adjustment apparatus of FIG. 7.
Figure 10:
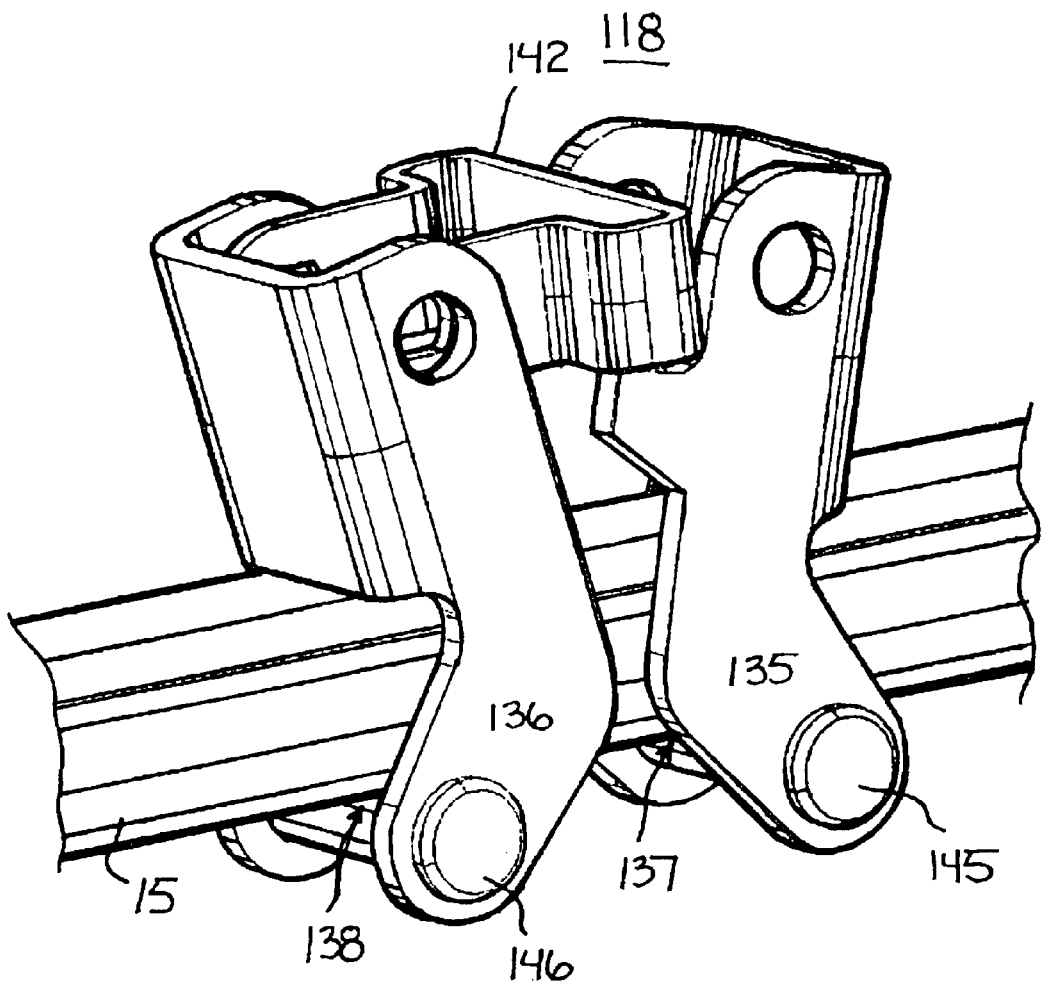
FIG. 10 is another embodiment of the portion of the continuous seat adjustment apparatus.
Figure 11:
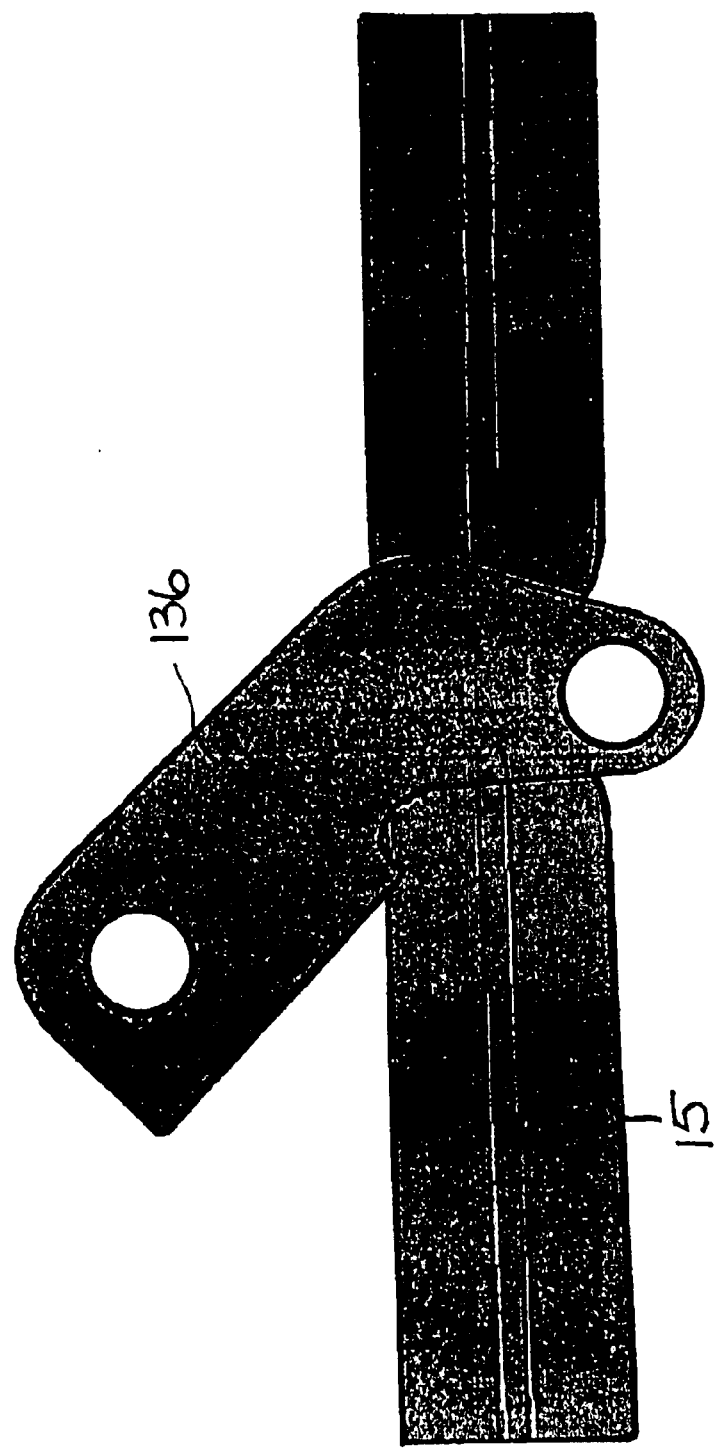
FIGS. 11–14 show views of a jaw actually deforming or denting an inner track upon a large force during a crash.
Figure 12:
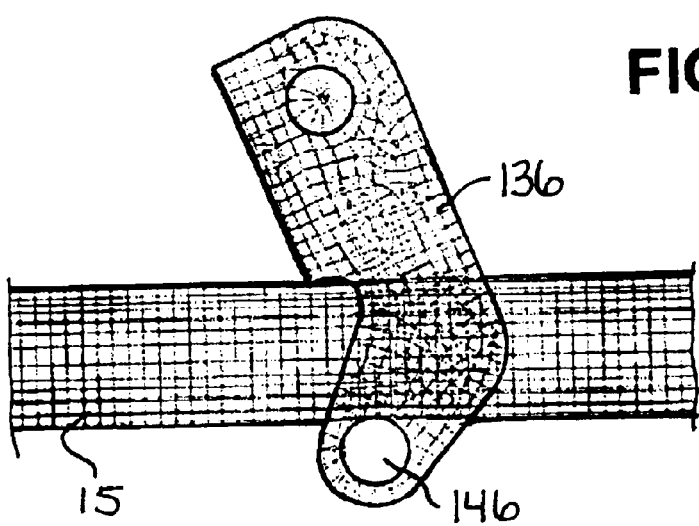
Figure 13:
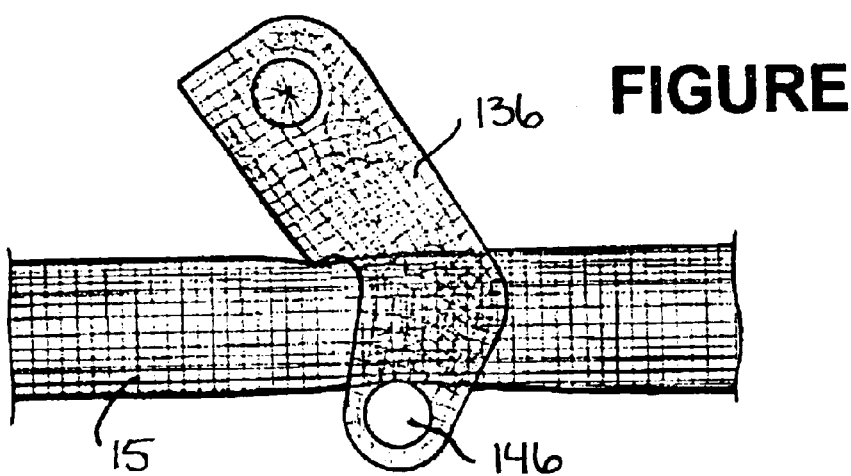
Figure 14:
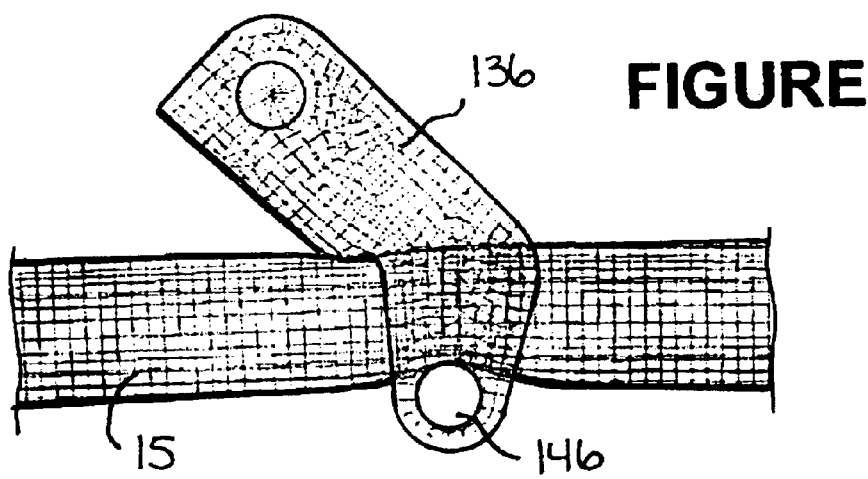

Referring additionally to FIGS. 8 and 9, exploded views of adjustment mechanism 18 are illustrated to better view and understand the assembly. Adjustment mechanism 18 can be easily operated to continuously adjust the longitudinal position of a seat anywhere between a maximum and a minimum position so as to achieve an optimum position for each user. Thus, it can be seen that adjustment mechanism 18 is relatively easy and simple to manufacture and assemble. Further, the new and improved continuous seat adjustment apparatus is rugged and can withstand vehicle impact shocks, and absorb some of the impact energy while restraining the occupant longitudinally.

Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. Continuous seat adjustment apparatus for use in conjunction with a seating device, comprising:

a track assembly having a tubular inner track with a deformable surface, and an outer track movable on the tubular inner track;

a pair of opposed jaws mounted on the outer track for pivotal movement between first, second, and third orientations, each of the jaws having an opening defined therethrough receiving the inner track therein, the jaws frictionally engaging the inner track in the first orientation to substantially prevent longitudinal movement along the inner track, the jaws releasing the inner track in the second orientation to allow continuous longitudinal movement along the inner track, and the jaws deforming the deformable surface of the tubular inner track in the third orientation to form a mechanical engagement therewith and prevent longitudinal movement along the inner track;

a spring device affixed to the pair of opposed jaws to provide a bias on the jaws tending to move the jaws into the first orientation; and an adjustment member affixed to one of the jaws for moving the jaws against the spring bias from the first orientation to the second orientation.

2. Continuous seat adjustment apparatus as claimed in claim 1 wherein each jaw of the pair of opposed jaws is pivotally mounted on the outer track and the inner track extends longitudinally through the openings defined in the jaws.

3. Continuous seat adjustment apparatus as claimed in claim 2 wherein one jaw of the pair of jaws is pivotally mounted by a bolt and another jaw of the pair of jaws is mounted by the adjustment member.

4. Continuous seat adjustment apparatus as claimed in claim 3 wherein the adjustment member includes a connecting rod with a non-round cross-section positioned in a mating hole in the another jaw.

5. Continuous seat adjustment apparatus as claimed in claim 1 wherein the spring device includes a tension spring affixed to each jaw of the pair of jaws.

6. Continuous seat adjustment apparatus used in conjunction with a seating device including a track assembly having an inner track and an outer track longitudinally movable on the inner track, the apparatus comprising:

a pair of opposed jaws mounted on the outer track for pivotal movement between first and second orientations, each of the jaws having an opening defined therethrough with the inner track longitudinally extending therethrough, the inner track having a deformable surface, the jaws frictionally engaging the deformable surface of the inner track in the first orientation to substantially prevent longitudinal movement along the inner track, the jaws releasing the inner track in the second orientation to allow continuous longitudinal movement along the inner track, and the jaws deforming the deformable surface of the inner track in the third orientation to form a mechanical engagement therewith and prevent longitudinal movement along the inner track upon application of a force;

a spring device affixed to the pair of opposed jaws to provide a bias on the jaws tending to move the jaws into the first orientation; and an adjustment member affixed to one of the jaws for moving the jaws against the spring bias from the first orientation to the second orientation.

7. Continuous seat adjustment apparatus as claimed in claim 6 wherein one jaw of the pair of jaws is pivotally mounted by a bolt and another jaw of the pair of jaws is mounted by the adjustment member.

8. Continuous seat adjustment apparatus as claimed in claim 7 wherein the adjustment member includes a connecting rod with a non-round cross-section positioned in a mating hole in the another jaw.

9. Continuous seat adjustment apparatus as claimed in claim 6 wherein the spring device includes a tension spring affixed to each jaw of the pair of jaws.

10. Continuous seat adjustment apparatus Used in conjunction with a seating device including a track assembly having first and second spaced apart inner tracks and first and second spaced apart outer tracks longitudinally movable on the first and second inner tracks, respectively, the apparatus comprising:

first and second adjustment devices, the first adjustment device associated with the first inner track and the first outer track and the second adjustment device associated with the second inner track and the second outer track;

the first adjustment device including a first pair of opposed jaws mounted on the first outer track for pivotal movement between first, second, and third orientations, each of the jaws of the first pair having an opening defined therethrough with the first inner track longitudinally extending therethrough, the first inner track having a deformable surface, the first pair of jaws frictionally engaging the deformable surface of the first inner track in the first orientation to substantially prevent longitudinal movement along the first inner track, the first pair of jaws releasing the first inner track in the second orientation to allow continuous longitudinal movement along the first inner track, and the first pair of jaws deforming the deformable surface of the first inner track in the third orientation to form a mechanical engagement therewith and prevent longitudinal movement along the first inner track, and a spring device affixed to the first pair of jaws to provide a bias on the first pair of jaws tending to move the first pair of jaws into the first orientation;

the second adjustment device including a second pair of opposed jaws mounted on the second outer track for pivotal movement between first, second, and third orientations, each of the jaws of the second pair having an Opening defined therethrough with the second inner track longitudinally extending therethrough, the second inner track having a deformable surface, the second pair of jaws frictionally engaging the deformable surface of the second inner track in the first orientation to substantially prevent longitudinal movement along the second inner track, the second pair of jaws releasing the second inner track in the second orientation to allow continuous longitudinal movement along the second track, and the first pair of jaws deforming the deformable surface of the second inner track in the third orientation to form a mechanical engagement therewith and prevent longitudinal movement along the second inner track, a spring device affixed to the second pair of jaws to provide a bias on the second pair of jaws tending to move the second pair of jaws into the first orientation; and an adjustment member affixed to one of the jaws of each of the first and second pairs of jaws for moving the first and second pairs of jaws against the spring bias from the first orientation to the second orientation.

11. Continuous seat adjustment apparatus as claimed in claim 10 wherein one jaw of each of the first and second pairs of jaws is pivotally mounted by a bolt and another jaw of each of the first and second pairs of jaws is mounted by the adjustment member.

12. Continuous seat adjustment apparatus as claimed in claim 11 wherein the adjustment member includes a connecting rod with a non-round cross-section positioned in a mating hole in each of the another jaws, to provide uniform movement of the another jaws.

13. Continuous seat adjustment apparatus as claimed in claim 12 wherein the adjustment member further includes an adjustment lever attached to the connecting rod for rotation of the connecting rod.

14. Continuous seat adjustment apparatus as claimed in claim 10 wherein the Spring device includes a tension spring affixed to each jaw of each of the first and second pairs of jaws.

* * * * *